United States Patent [19]

Safar

[11] Patent Number: 4,593,467

[45] Date of Patent: Jun. 10, 1986

[54] CIRCULAR CUTTER

[76] Inventor: Tibor Safar, 95 Thorndyke Rd., Rochester, N.Y. 14617

[21] Appl. No.: 725,104

[22] Filed: Apr. 19, 1985

[51] Int. Cl.⁴ .............................................. B26B 3/08
[52] U.S. Cl. ........................................ 30/300; 30/310; 408/181
[58] Field of Search ......................... 30/300, 310, 130; 279/3; 408/181, 182, 185, 189, 1 R, 95; 82/1.2

[56] References Cited

U.S. PATENT DOCUMENTS

| | | | |
|---|---|---|---|
| 958,941 | 5/1910 | Rose | 30/300 |
| 1,283,258 | 10/1918 | Misener et al. | |
| 2,200,730 | 5/1940 | Smallwood et al. | |
| 2,677,887 | 5/1954 | Saboda | 408/181 X |
| 2,778,108 | 1/1957 | Welsh | 30/300 |
| 2,906,145 | 9/1959 | Morse | 408/181 |
| 2,997,900 | 8/1961 | Pugsley | |
| 3,004,766 | 10/1961 | Bryant | 279/3 |
| 3,065,654 | 11/1962 | Critelli et al. | |
| 3,558,385 | 1/1971 | Ronning | 30/130 X |
| 3,786,564 | 1/1974 | Acheson | 30/310 |
| 4,179,231 | 12/1979 | Hadden | 408/112 |

Primary Examiner—Jimmy C. Peters
Attorney, Agent, or Firm—Stonebraker, Shepard & Stephens

[57] ABSTRACT

A circular cutter 10 has a drive shaft 11 that turns a beam 30 bearing one or two cutter knives 50 rotated within a drum 20 mounted on shaft 11 to surround beam 30. A pressure shoe 25 on the bottom of drum 20 has a central opening 26 within which cutter knives 50 can turn, and drum 20 is biased downward relative to shaft 11 and beam 30 so that pressure shoe 25 engages and holds a work piece 60 as it is cut. Pressure shoe 25 is preferably interchangeable to afford different sizes of central openings 26 for different radii of cuts, knives 50 are preferably radially adjustable along beam 30, and drum 20 is preferably transparent to serve as a guard that the user can see through.

24 Claims, 6 Drawing Figures

CIRCULAR CUTTER

BACKGROUND

I have discovered a better and more versatile way of making circular cuts in sheet material, including flexible, non-rigid, or elastic material that is especially difficult to cut. My cutter can make one or two circular cuts at a time, can make the cuts at varying radii, can be adjusted quickly and easily, is safe and accurate to use, and automatically holds the work piece being cut. It eliminates much more lengthy conventional methods that involve drilling, sawing, turning, grinding, finishing, and possibly fabricating special tools for specific cuts.

SUMMARY OF THE INVENTION

My circular cutter has a drive shaft that turns a beam bearing one or two cutter knives. A drum mounted on the shaft surrounds the beam and allows the shaft and beam to turn and move up and down within the drum. A pressure shoe on the bottom of the drum has a central opening within which cutter knives can turn, and the drum is biased downward relative to the shaft and the beam so that the pressure shoe engages and holds a work piece as it is cut. The pressure shoe is preferably interchangeable to afford different sizes of central openings for different radii of cuts. The knives are preferably radially adjustable along the beam, and the drum is preferably transparent to serve as a guard that the user can see through.

DRAWINGS

DETAILED DESCRIPTION

Figure 5:
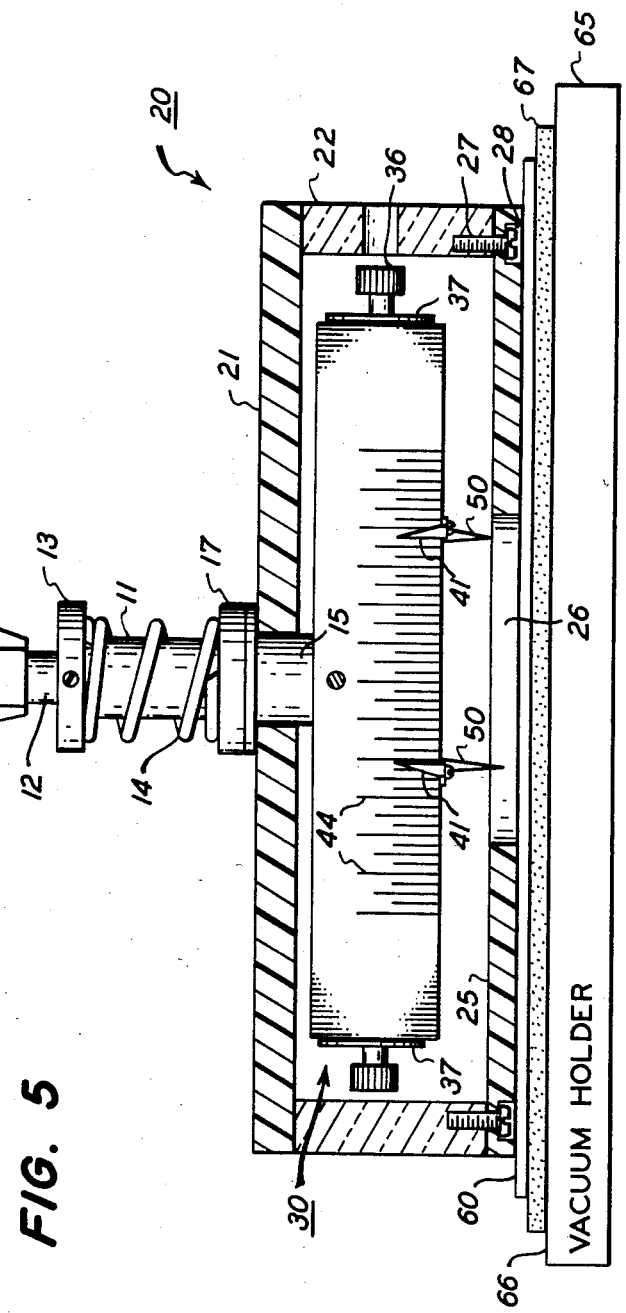
FIG. 5 is a partially cross-sectioned, side elevational view of the cutter of FIG. 1 arranged for cutting a work piece.

Cutter 10 is mounted on a lower drive shaft 11 integral with an upper shaft 12 held in a chuck 16 of a machine such as a drill press, lathe, or jigborer that can rotate chuck 16 and cutter 10. The specification and claims assume a vertically downward cutting orientation for cutter 10 as best shown in FIG. 5, but cutter 10 can also be operated horizontally or at some other orientation.

A collar 13 fixed to shaft 11 engages a compression spring 14 surrounding shaft 11 and engaging a thrust bearing 17 and a bearing 15 in the top 21 of drum 20 for biasing drum 20 downward. A cutting beam 30 mounted on the lower end of shaft 11 rotates within drum 20 where beam 30 can move up and down relative to drum 20 on shaft 11. Bearing 15 preferably spaces the uppermost position of beam 30 below top 21 of drum 20 to prevent beam 30 from rubbing against the underside of top 21.

Drum 20 is preferably made of transparent resin material so that an operator can see beam 30 within drum 20. Such transparency can be achieved by forming outer wall 22 of a clear cylindrical resin tube or a cylindrical array of resin sectors joined to a clear resin top 21 and a clear resin pressure shoe 25. Many alternatives are available for suitable resin materials and ways of joining the resin parts.

Either one or two cutters 50 extend below the bottom of beam 30 so that when beam 30 is lowered within drum 20, cutters 50 advance through a circular central opening 26 in pressure shoe 25 at the bottom of drum 20 and cut into a work piece 60. Since drum 20 is biased downward relative to beam 30 by spring 14, pressure shoe 25 engages and presses against work piece 60 before knives 50 begin to cut.

One or two circles can be cut in work piece 60 as knives 50 rotationally advance. If two circles are cut, they are made at different radii, and the knife 50 making the smaller cut preferably extends further below beam 30 to advance slightly ahead of the knife 50 making the larger cut. This lets an inner knife complete a cut before an outer knife cuts away a disk in which the inner cut is being made.

I prefer having several pressure shoes 25 with different sizes of central openings 26 available for drum 20. This allows an opening 26 to be selected to fit closely around the largest diameter cut being made with a knife 50 so that work piece 60 is held by pressure shoe 25 as closely as possible around the largest diameter cut. To facilitate changing pressure shoes 25, I prefer a quick connect and disconnect attachment. My preference for this is screws 27 recessed above the bottom of pressure shoe 25 and fitted within keyhole slots 28 oriented so that operating torque tending to turn pressure shoe 25 relative to work piece 60 holds pressure shoe 25 in place on screws 27. Then it is only necessary to rotate pressure shoe 25 slightly relative to screws 27 for removing pressure shoe 25 and substituting another pressure shoe 25 with a different sized central opening 26.

Beam 30 has a channel 31 that opens downward and holds a pair of knife blocks 40. Each knife block 40 can mount a knife 50 with a screw 42 that allows either knife 50 to be removed.

Beam channel 31 has side grooves 32 in which ribs 43 of knife blocks 40 guide for radial movement in channel 31. Such radial movement is controlled by screws 34 threaded through knife blocks 40 so that turning of screws 34 moves knife blocks 40 radially of beam 30.

Screws 34 are journaled in end blocks 33 secured in channel 31 at each end of beam 30. An unthreaded shaft 35 of each screw 34 is rotatably housed in each end block 33, which is preferably split in half and secured together around shaft 35 and fixed in the ends of channels 31 by screws 39. Radially beyond end blocks 33, screws 34 have adjustment knobs 36 and preferably carry a dial 37 that can indicate fine adjustment relative to a mark 38 at each end of beam 30.

Preferably, knife blocks 40 also carry pointers 41 that extend to a scale 44 formed along a side of beam 30. Pointers 41 then indicate radial adjustment of knives 50, which is facilitated by making drum 20 transparent. Pressure shoe 25 can be removed for radially adjusting knives 50, or openings can be formed in drum wall 22 to provide access to adjusting knobs 36 by using an Allen wrench, for example.

For some elastic or easily deformable work pieces 60, such as pliable rubber or flexible felt, I prefer an additional work piece holder in the form of vacuum holder 65. Holder 65 has a perforated top surface through which air is drawn for holding a work piece against top surface 66. Since it is undesirable for knives 50 to contact holder surface 66, I interpose a thin, porous mat 67 between holder surface 66 and work piece 60. Filter paper or felted material can serve for porous mat 67, through which air can by drawn for holding work piece 60 firmly in place beneath pressure shoe 25.

To make a cut with cutter 10, the operator establishes radii for one or two cuts to be made by adjusting one or two knives 50 via knobs 36. Pointers 41 and scales 44 can be used for this and can be observed through drum 22. Fine adjustment in thousandths of an inch can be determined by dials 37 and pointer 38 at the ends of beam 30.

Figure 1:
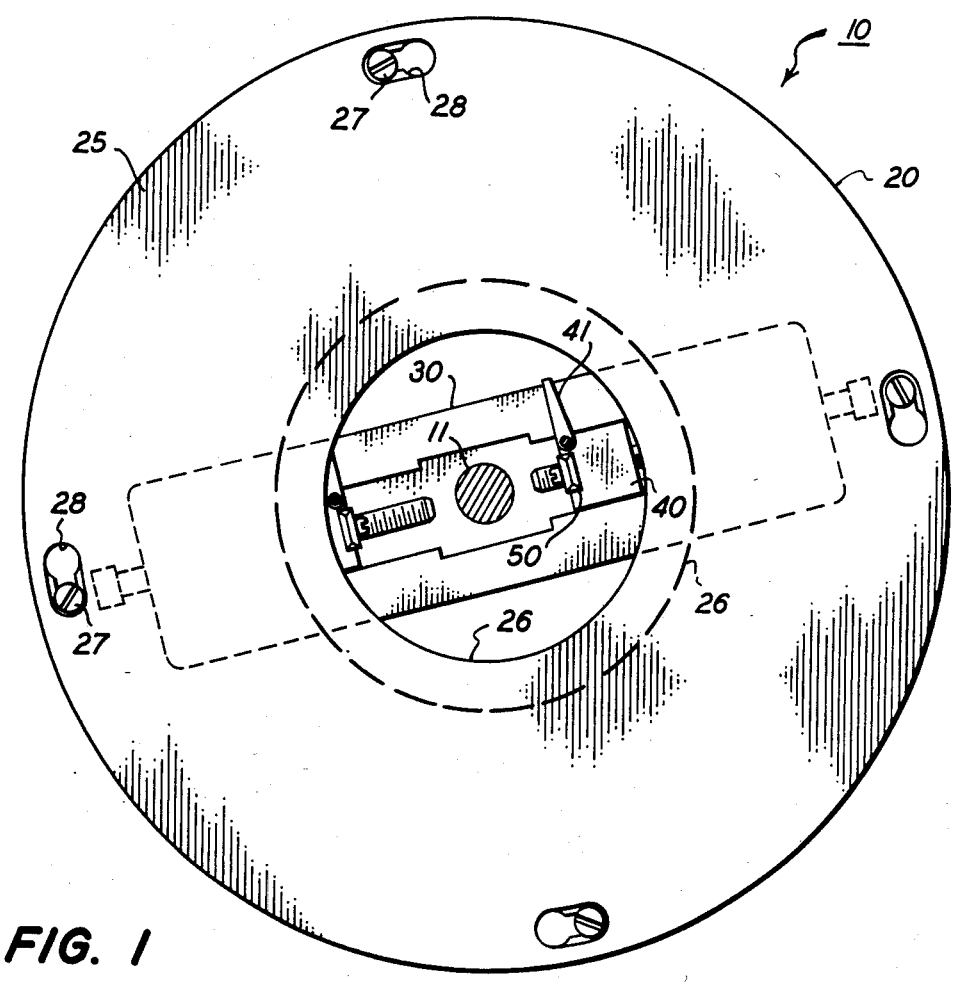
FIG. 1 is a bottom view of a preferred embodiment of my circular cutter.
Figure 2:
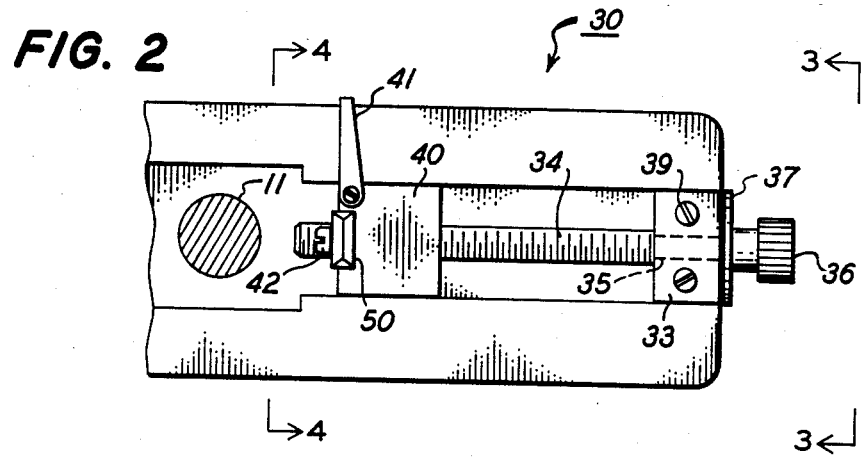
FIG. 2 is a fragmentary bottom view of the beam of the cutter of FIG. 1.
Figure 3:
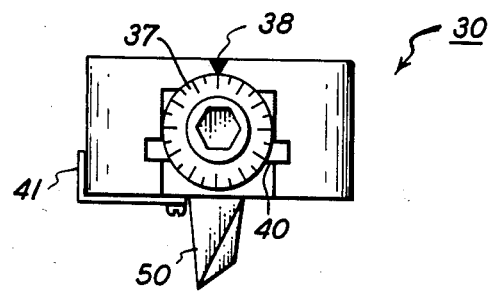
FIG. 3 is an end view of the beam of the cutter of FIGS. 1 and 2.
Figure 4:
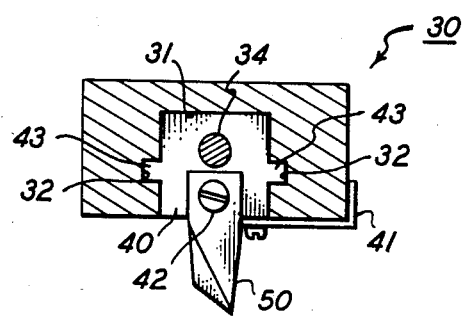
FIG. 4 is a cross-sectional view of the beam of FIG. 2, taken along the line 4—4 thereof.
Figure 6:
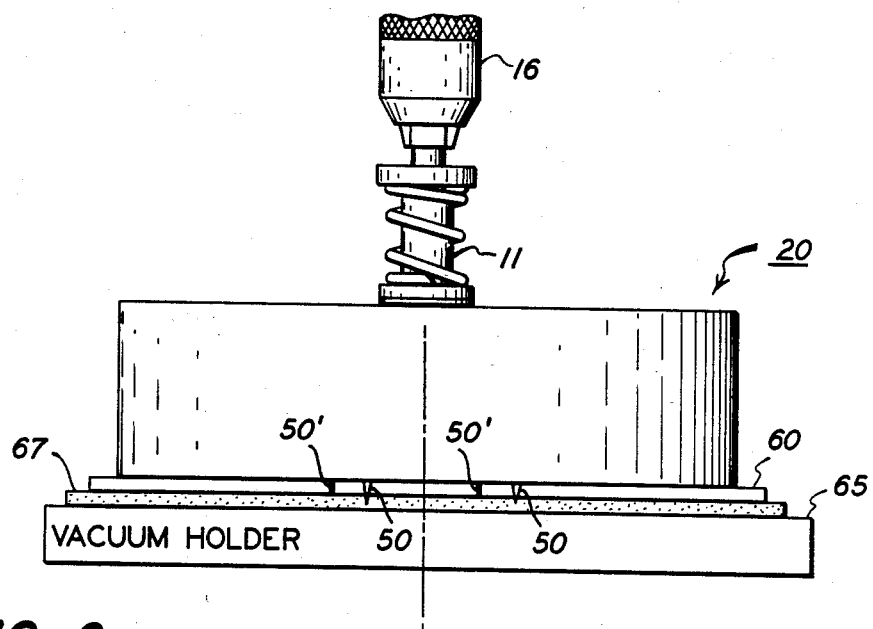
FIG. 6 is a side elevational view of the cutter of FIG. 5 showing a completed cut.

The operator then positions a substrate such as porous mat 67 or a backup board formed of wood, fiber, or soft material to underlie the work piece and sets a depth of cut on the drill press or other machine turning chuck 16. The operator then raises drum 20 and places work piece 60 in position for the cut. Then the operator lowers drum 20 so that pressure shoe 25 engages and holds work piece 60. Then chuck 16 is turned to rotate shaft 11 and beam 30 and drive knives 50 in circles. Pressing the rotating beam 30 downward advances knives 50 into work piece 60 to complete the intended circular cuts 50' shown in FIG. 6.

Cutter 10 can be used for cutting disks, washers, and circular holes; and cutter 10 can quickly make an endless variety of circular cuts in many different types of thin sheet material. Compared with prior art methods, cutter 10 is fast, convenient, and efficient in making circular cuts on a low volume basis.

I claim:

1. A work piece holder and guard for a circular cutter having a rotary beam bearing a downwardly extending cutting knife, said beam being mounted transversely on a shaft attachable to a rotary chuck that can move axially to advance and retract said cutter relative to a work piece and can rotate said cutter relative to said work piece for making a circular cut, said work piece holder and guard comprising:
   a. a transparent guard drum having a generally cylindrical wall surrounding and enclosing the rotational path of said beam;
   b. said drum having a transparent top rotatably mounted on said shaft above said beam and enclosing a region between said shaft and an upper region of said cylindrical wall;
   c. a transparent, annular pressure shoe removably secured to a lower region of said cylindrical wall and extending below said beam in a plane parallel with said work piece radially inward from said cylindrical wall to a central opening in said pressure shoe through which said cutting knife can advance; and
   d. a spring axially biasing said drum downward on said shaft relative to said beam so that said drum and said pressure shoe move up and down with said chuck and said beam throughout a region wherein said pressure shoe moves clear of said work piece, and said spring is compressed throughout a region of axial movement of said chuck and said beam wherein said pressure shoe engages and holds said work piece in place and said cutting knife advances into cutting engagement with said work piece while guarded by said drum.

2. The holder and guard of claim 1 including a plurality of said pressure shoes interchangeably mountable on said drum and having said central opening in different sizes to accommodate different diameter cuts.

3. The holder and guard of claim 2 including a quick connect and disconnect mounting for said pressure shoes on said drum.

4. The holder and guard of claim 3 wherein said quick connect and disconnect mounting includes screws on said drum and keyhole slots in said pressure shoes engageable by heads of said screws.

5. The holder and guard of claim 1 including a collar fixed on said shaft above said drum and a bearing between said drum and said shaft, and said spring is a compression spring around said shaft between said collar and said bearing.

6. The holder and guard of claim 5 including a thrust bearing between said spring and said drum.

7. The holder and guard of claim 1 wherein said beam is a single piece secured to said shaft and having a channel opening downward along a bottom region of said beam, a pair of knife blocks are fitted accurately within said channel for moving to radially adjustable positions along said channel, sides of said channel and said knife blocks have mating ridges and grooves, and each of said knife blocks carries one of said cutting knives.

8. The holder and guard of claim 7 including a collar fixed on said shaft above said drum and a bearing between said drum and said shaft, a thrust bearing between said spring and said drum, and said spring is a compression spring around said shaft between said collar and said bearing.

9. The holder and guard of claim 8 including a plurality of said pressure shoes interchangeably mountable on said drum and having said central opening in different sizes to accommodate different diameter cuts and including a quick connect and disconnect mounting for said pressure shoes on said drum.

10. In a circular cutter for use in a machine having a rotatable chuck that is movable axially, said circular cutter having a drive shaft attachable to said chuck for turning a beam mounted transversely of said shaft and bearing a radially adjustable cutter knife, the improvement comprising:
   a. a guard drum rotationally mounted on said shaft above said beam to extend radially outward from said shaft over said beam and downward in a generally cylindrical wall surrounding the rotational path of said beam;
   b. said guard drum being formed of transparent material allowing an operator to see through said drum for observing said cutter, and said guard drum being substantially closed from said shaft to a bottom region of said cylindrical wall to keep an operator's fingers away from said beam when said beam is turning within said drum;
   c. an annular, transparent pressure shoe removably secured to said bottom region of said cylindrical wall to lie in a plane below said beam and to extend radially inward from said cylindrical wall to a central opening of said pressure shoe within which said cutter knife can turn; and
   d. a stop, a spring, and a thrust bearing arranged for urging said drum downward relative to said shaft and said beam so that said drum and said pressure shoe move with said chuck and said beam throughout a region clear of said work piece, and while said pressure shoe engages and holds said work piece, said chuck can advance said beam toward said work piece by compression said spring and can rotate said beam against said work piece within said opening in said pressure shoe to make a circular cut.

11. The improvement of claim 10 wherein said beam is a single piece secured to said shaft and having a channel opening downward along a bottom region of said beam; a pair of knife blocks, each bearing one of said cutter knives, are fitted accurately within said channel for moving to radially adjustable positions along said channel; and said sides of said channels and said knife blocks have mating ridges and grooves.

12. The improvement of claim 10 including a plurality of said pressure shoes interchangeably mountable on said drum and having said central opening in different sizes to accommodate different diameter cuts.

13. The improvement of claim 12 including a quick connect and disconnect mounting for said pressure shoes on said drum.

14. The improvement of claim 13 wherein said quick connect and disconnect mounting includes screws on said drum and keyhole slots in said pressure shoes engageable by heads of said screws.

15. The improvement of claim 14 wherein said beam is a single piece secured to said shaft and having a channel opening downward along a bottom region of said beam; a pair of knife blocks, each bearing one of said cutter knives, are fitted accurately within said channel for moving to radially adjustable positions along said channel; and said sides of said channels and knife blocks have mating ridges and grooves.

16. In a circular cutter having a shaft rotating a beam carrying a pair of radially adjustable cutter knives, the improvement comprising:
   a. said beam being a single piece of steel secured to said shaft and having closed sides and top and a channel oriented to open downward along a bottom of said beam;
   b. a pair of knife blocks movable radially in said channel and bearing said knives to extend below said beam, said knife blocks and said channel having mating ridges and grooves extending along opposite sides of said channel; and
   c. a transparent guard drum mounted on said shaft for rotational and vertical movement relative to said beam, said guard drum being shaped for extending outward above said beam to a generally cylindrical wall surrounding the rotational path of said beam and extending down to engagement with a work piece being cut by said knives.

17. The improvement of claim 16 including a collar fixed on said shaft above said drum, a bearing between said drum and said shaft, and a compression spring around said shaft between said collar and said bearing for biasing said drum downward relative to said beam.

18. The improvement of claim 17 wherein said bearing includes a thrust bearing.

19. The improvement of claim 17 including an annular pressure shoe removably attached to a bottom region of said guard drum to extend radially inward below said beam to a central opening in said pressure shoe closely surrounding a cut made by the outermost one of said knives.

20. The improvement of claim 19 including a plurality of said pressure shoes interchangeably mountable on said guard drum and having said central opening in different sizes to accommodate different diameter cuts.

21. The improvement of claim 20 including a quick connect and disconnect mounting for said pressure shoes on said guard drum.

22. The improvement of claim 21 wherein said quick connect and disconnect mounting includes screws on said drum and keyhole slots in said pressure shoes engageable by heads of said screws.

23. The improvement of claim 22 including a collar fixed on said shaft above said drum, a bearing between said drum and said shaft, and a compression spring around said shaft between said collar and said bearing for biasing said drum downward relative to said beam.

24. The improvement of claim 23 wherein said bearing includes a thrust bearing.

* * * * *